May 3, 1927.
J. W. CARTHEW
1,626,599
TEST GAUGE
Filed Aug. 13, 1925
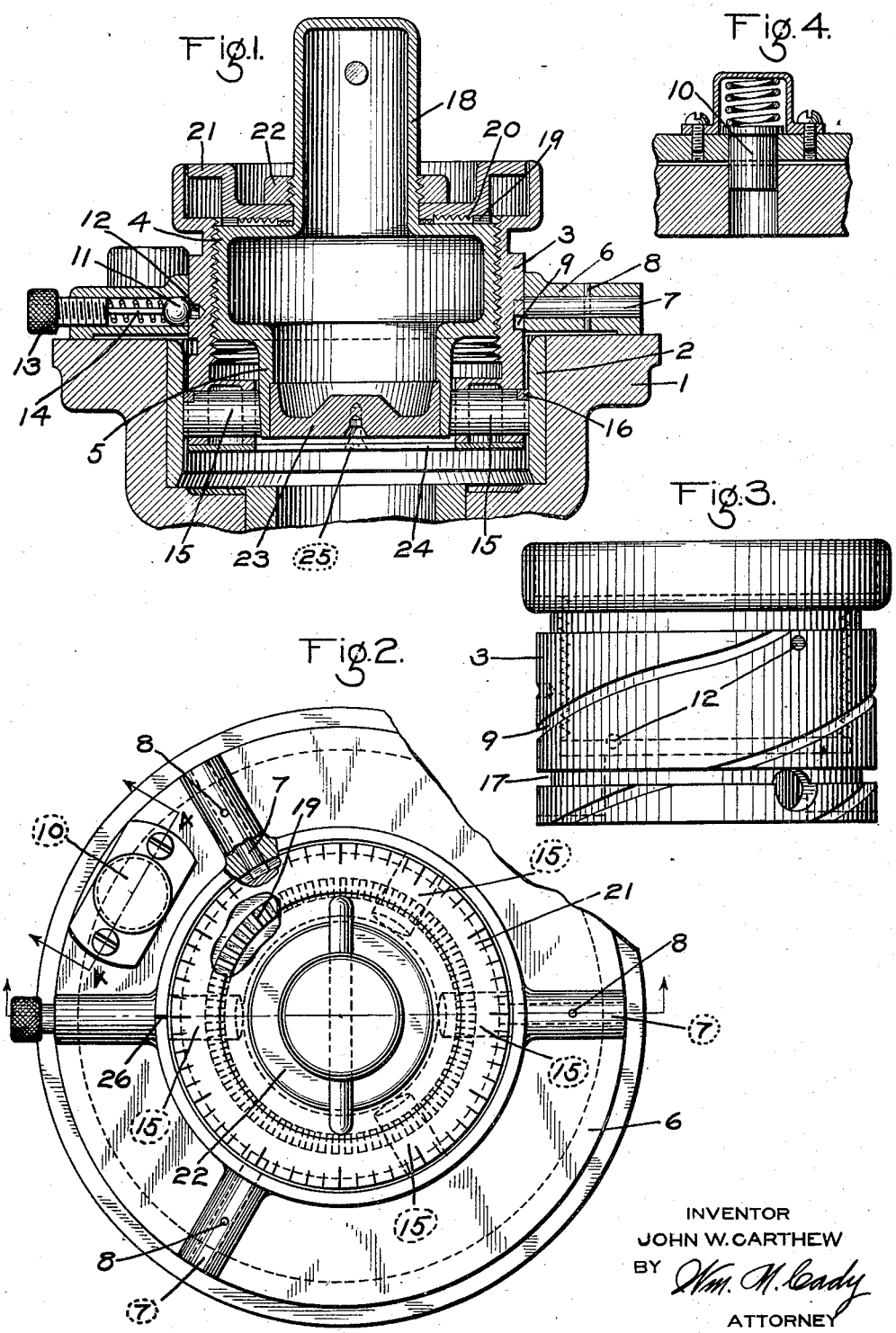
INVENTOR
JOHN W. CARTHEW
BY Wm. M. Cady
ATTORNEY Patented May 3, 1927.

1,626,599

UNITED STATES PATENT OFFICE.

JOHN W. CARTHEW, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TEST GAUGE.

Application filed August 13, 1925. Serial No. 50,001.

This invention relates to gauges and has for its principal object to provide an improved gauge device for measuring the inside diameter of any cylindrical bore.

In the accompanying drawing; Fig. 1 is a vertical section of my improved gauge device as applied to a bushed cylinder; Fig. 2 a plan view of the gauge; Fig. 3 a detail view of the sleeve member employed in the gauge; and Fig. 4 a section on line 4—4 of Fig. 2.

For the purpose of illustration, I have shown my gauge as applied to the piston cylinder of an ordinary triple valve device, but as before stated, the gauge may be used in measuring the inside diameter of any cylindrical bore.

Referring to the drawing, reference numeral 1 indicates a triple valve casting having a piston cylinder bush 2 and mounted in said bush is a gauge device which may comprise a sleeve member 3, internally threaded to receive an externally threaded hollow plug 4 having a tapered portion 5. Associated with sleeve member 3 is an adjusting plate 6 adapted to engage casting 1 and provided with a plurality of radial bores for receiving pins 7, which are held in place by cotter pins 8. The pins 7 are adapted to engage a spiral groove 9 cut in the outer wall of sleeve member 3, said pins acting as guides, so that the sleeve member 3 may be screwed in or out of the bushing 2. A spring pressed pin 10 carried by plate 6 is adapted to engage a bore in the casting 1, so as to hold the adjusting plate 6 in position against rotation with respect to the casting 1.

A spring pressed ball 11 is provided in adjusting plate 6 and is adapted in different positions of the sleeve member 3 to engage one of a plurality of recesses 12, provided in the outer wall of said sleeve member, for defining the different positions thereof, and a screw 13 having a stem 14 adapted to engage ball 11 is provided for the purpose of holding the ball in locking engagement with a particular recess when desired.

Mounted in radially extending bores provided in sleeve members 3 are gauge pins 15, said pins being adapted to engage at one end the tapered portion 5 of plug 4 and said pins are yieldingly held in engagement therewith by a split spring ring 16 disposed in a ring groove 17 in sleeve member 3.

On the radial wall connecting the upwardly extending handle portion 18 of plug 4 with the threaded portion are radial serrations 19, which are adapted to mesh with serrations 20 on the under face of dial plate 21, said plate being provided with a central bore so that it can be slipped over handle portion 18 and of such diameter as to fit loosely in sleeve member 3. A nut 22 having screw-threaded engagement with handle portion 18 is provided to clamp the dial plate 21 in engagement with the serrations on plug 4. The top face of dial plate 21 is marked off in graduations, and preferably the number of graduations are made equal to the number of serrations 19.

In order to simplify the reading of the gauge, it is preferable to so adjust the gauge that the dial plate will read zero when the gauge pins are set for a predetermined diameter to be measured. In order to so set the gauge device, the sleeve member 3 is inserted into a cylinder or ring ground accurately to the predetermined diameter. The plug 4 is then screwed into sleeve member 3 until the tapered portion 5 of plug 4 has forced the gauge pins 15 into engagement with the walls of the cylinder.

The nut 22 is then loosened so that the dial plate 21 can be disengaged from the serrations 19 on plug 4 and the dial plate is then rotated until the graduation representing zero on the dial plate registers with zero mark 26 on the edge of sleeve member 3. The number of serrations being equal to the number of graduations, the dial plate may now be placed in engagement with the serrations on plug 4 and nut 22 tightened, so as to lock said plate in its adjusted position.

When it is desired to measure the inside diameter of a cylinder, the adjusting plate 6 of the gauge device is mounted on the end of the cylinder, with the spring pressed pin 10 engaging a bore in the cylinder casting so as to hold said plate against rotation. The sleeve member 3 is then screwed into the cylinder until gauge pins 15 are opposite the place in the cylinder where it is desired to measure the diameter. The spring pressed ball 11 will then engage a recess 12 corresponding with this position, after which screw 13 is tightened, pressing ball 11 into locking engagement with said recess, so as to lock the sleeve member against further rotation.

The plug 4 and consequently dial plate 21 is then rotated, by use of handle portion 18, until gauge pins 15 engage the walls of the cylinder. The amount that the cylinder is oversize may then be read, in decimal parts of an inch, by the number of graduations the zero mark on the dial plate is away from the zero point 26 on sleeve member 3.

If the cylinder is undersize, the plug 4 is rotated in the opposite direction, thereby withdrawing tapered portion 5 from between gauge pins 15, enabling the spring ring 16 to force said pins inwardly until the sleeve member 3 can be inserted into the cylinder, the amount that the cylinder is undersize being read in the same manner as when the cylinder is oversize.

If it is desired to measure the diameter of the cylinder at more than one place, the screw 13 is loosened, thereby releasing ball 11 from locking engagement with the particular recess 12 and enabling the sleeve member 3 to be rotated either in or out of the cylinder until the other desired position is indicated by the snapping of spring pressed ball 11 into another recess 12. The screw 13 is then tightened, locking the sleeve in this position, and the diameter is measured in the same manner as hereinbefore described.

The taper on portion 5 of plug 4 and the pitch of the external threads on plug 4 are so related that each graduation on the dial plate 21 represents a decimal part of an inch increase in the diameter spanned by the gauge pins, such, for example, as each graduation indicating .001 of an inch radial movement of the gauge pins.

Having now described my invention, what I claim as new and desire to secure by Letters Patent, is:—

1. A cylinder gauge comprising a sleeve having a screw thread, radially movable pins mounted in said sleeve, a plug having screw-threaded engagement in said sleeve and having a tapered portion engaging said pins, and a collar within which said sleeve is mounted and having means for engaging the screw-thread on said sleeve to permit axial adjustment of said sleeve.

2. A cylinder gauge comprising a sleeve adapted to be inserted in the cylinder bore and having radially movable pins mounted therein, means for radially moving said pins to engage the cylinder bore, and means for adjusting the sleeve to different depths in the cylinder bore.

3. A cylinder gauge comprising a sleeve adapted to be inserted in the cylinder bore and having radially movable pins mounted therein, means for radially moving said pins to engage the cylinder bore, and means for adjusting and locking said sleeve at different axial positions of said cylinder bore, to permit testing the cylinder bore at different depths.

In testimony whereof I have hereunto set my hand.

JOHN W. CARTHEW.